July 14, 1964
H. F. PARKER
3,140,669
CONVEYOR DISPATCH SYSTEM
Filed May 5, 1960
6 Sheets-Sheet 1
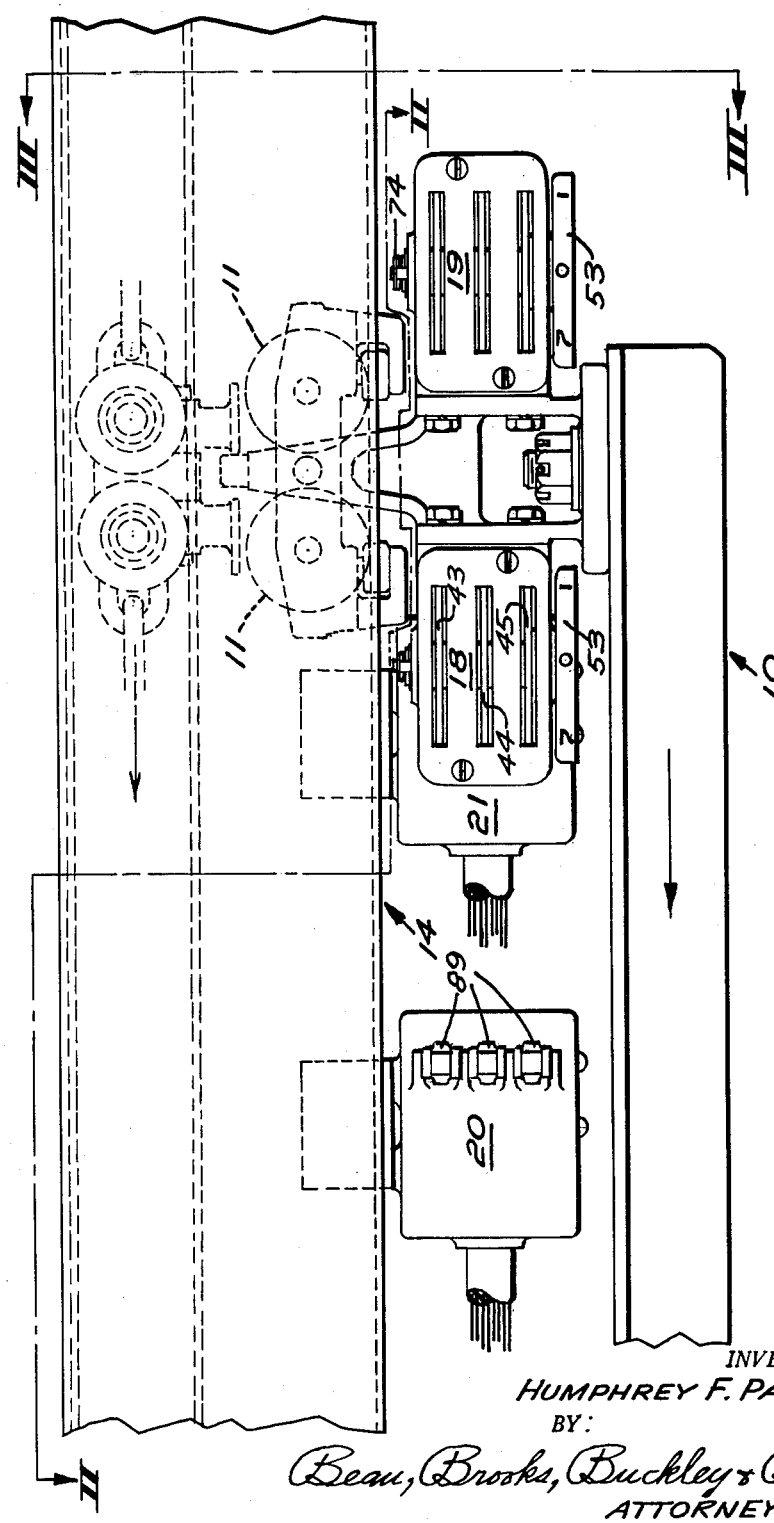
INVENTOR:
HUMPHREY F. PARKER
BY:
Beau, Brooks, Buckley & Beau,
ATTORNEYS.

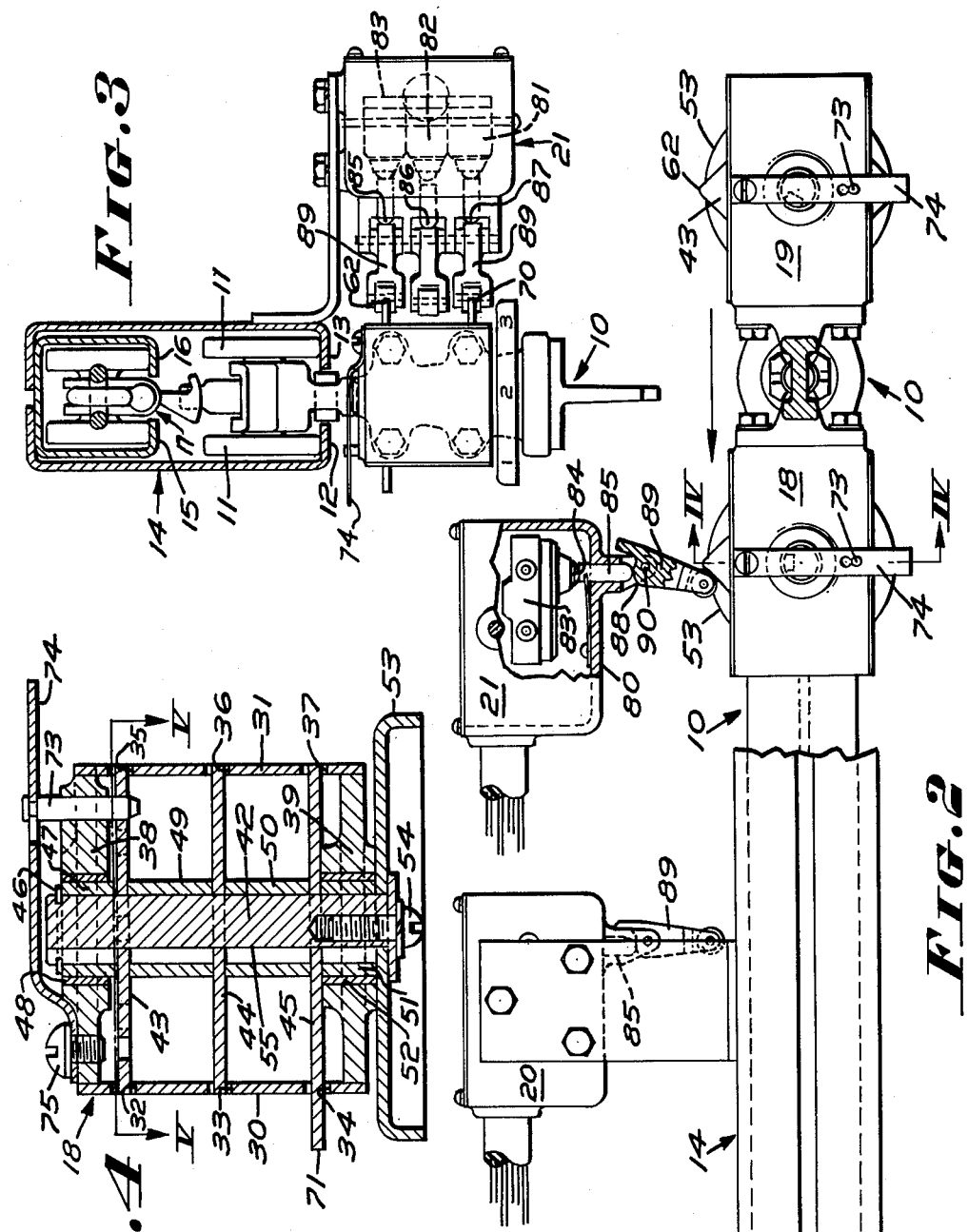

July 14, 1964   H. F. PARKER   3,140,669
CONVEYOR DISPATCH SYSTEM
Filed May 5, 1960   6 Sheets-Sheet 3
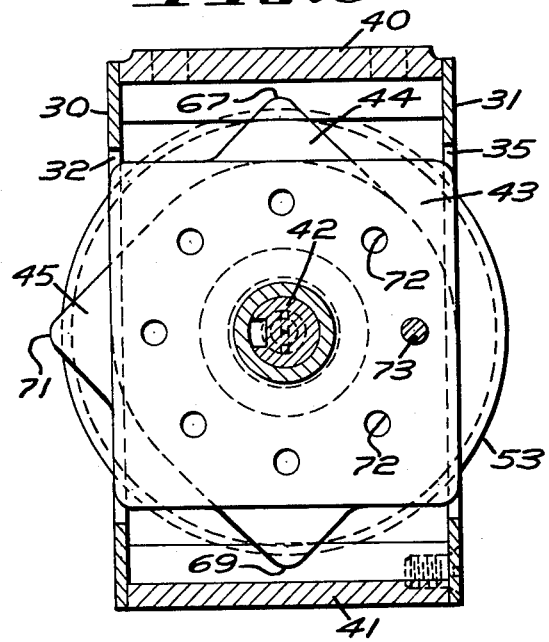
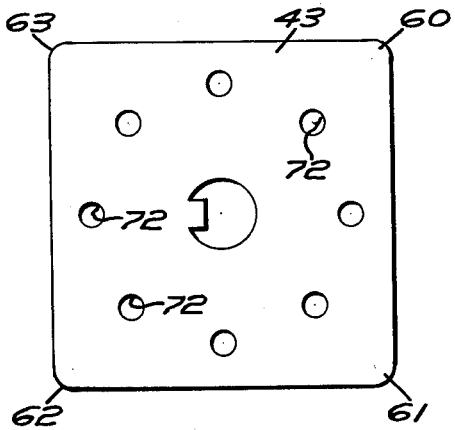
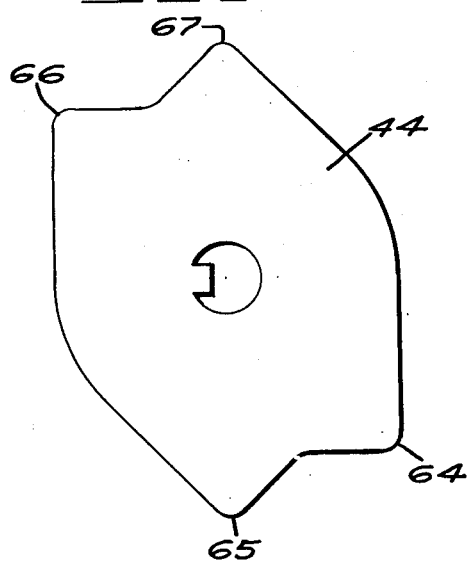
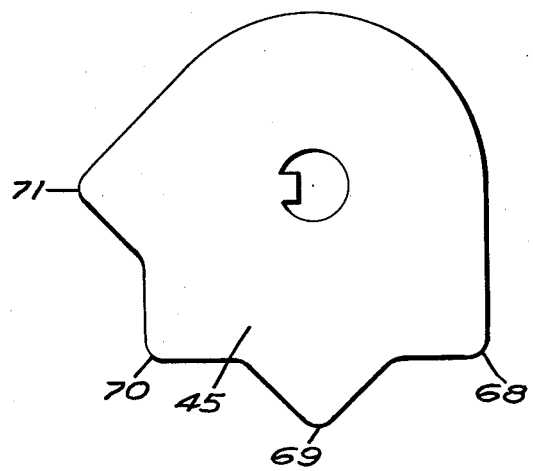
INVENTOR:
HUMPHREY F. PARKER
BY:
Beau, Brooks, Buckley & Beau,
ATTORNEYS.

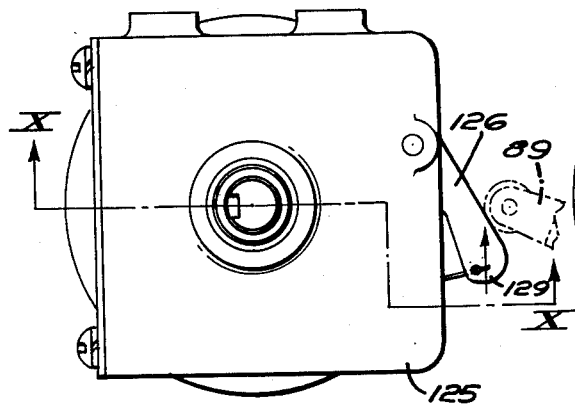
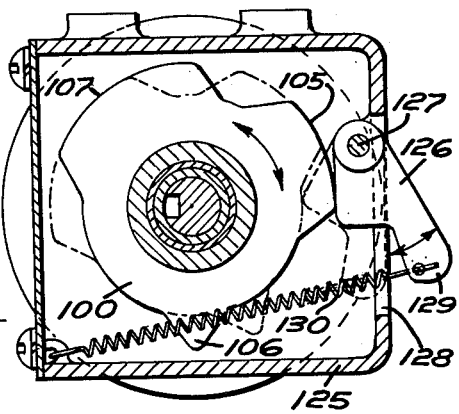
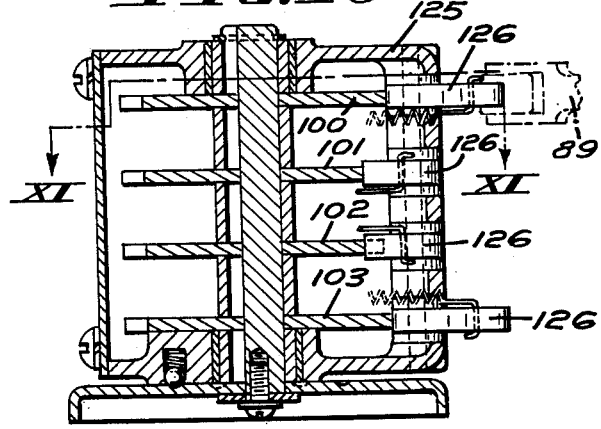
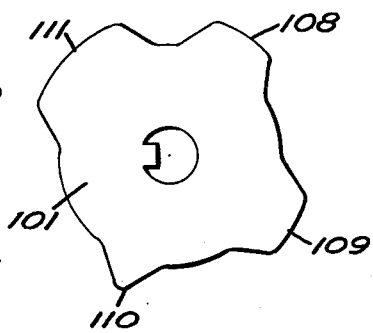
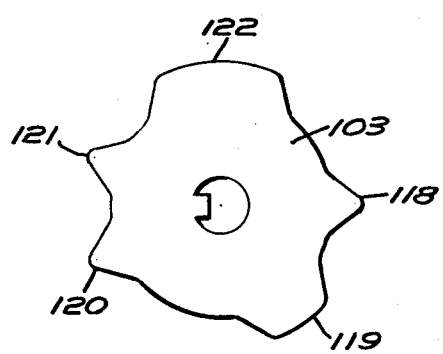
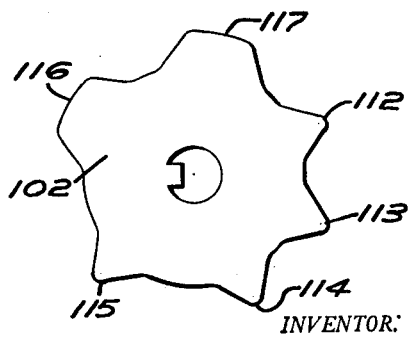

July 14, 1964  H. F. PARKER  3,140,669
CONVEYOR DISPATCH SYSTEM
Filed May 5, 1960  6 Sheets-Sheet 5

FIG. 15
DOUBLE OCTAL SELECTOR CODE

T

| | 0 | 1 | 2 | 3 | 4 | 5 | 6 | 7 |
|---|---|---|---|---|---|---|---|---|
| A | – | x | – | x | – | x | – | x |
| B | – | – | x | x | – | – | x | x |
| C | – | – | – | – | x | x | x | x |

U

| | 0 | 1 | 2 | 3 | 4 | 5 | 6 | 7 |
|---|---|---|---|---|---|---|---|---|
| A | – | x | – | x | – | x | – | x |
| B | – | – | x | x | – | – | x | x |
| C | – | – | – | – | x | x | x | x |

FIG. 16
QUADRUPLE LEVEL SELECTOR CODE

| LEVEL | 1 | 2 | 3 | 4 | 5 | 6 | 7 | 8 | A | B | C | D | E | F | G | H |
|---|---|---|---|---|---|---|---|---|---|---|---|---|---|---|---|---|
| #1 | – | – | – | – | – | – | – | – | x | x | x | x | x | x | x | x |
| #2 | – | – | – | – | x | x | x | x | – | – | – | – | x | x | x | x |
| #3 | – | – | x | x | – | – | x | x | – | – | x | x | – | – | x | x |
| #4 | – | x | – | x | – | x | – | x | – | x | – | x | – | x | – | x |

FIG. 17
QUINTUPLE LEVEL SELECTOR SYSTEM

| LEVEL | 1 | 2 | 3 | 4 | 5 | 6 | 7 | 8 | A | B | C | D | E | F | G | H | J | K | L | M | N | O | P | Q | R | S | T | U | V | X | Y | Z |
|---|---|---|---|---|---|---|---|---|---|---|---|---|---|---|---|---|---|---|---|---|---|---|---|---|---|---|---|---|---|---|---|---|
| #1 | – | – | – | – | – | – | – | – | – | – | – | – | – | – | – | – | x | x | x | x | x | x | x | x | x | x | x | x | x | x | x | x |
| #2 | – | – | – | – | – | – | – | – | x | x | x | x | x | x | x | x | – | – | – | – | – | – | – | – | x | x | x | x | x | x | x | x |
| #3 | – | – | – | – | x | x | x | x | – | – | – | – | x | x | x | x | – | – | – | – | x | x | x | x | – | – | – | – | x | x | x | x |
| #4 | – | – | x | x | – | – | x | x | – | – | x | x | – | – | x | x | – | – | x | x | – | – | x | x | – | – | x | x | – | – | x | x |
| #5 | – | x | – | x | – | x | – | x | – | x | – | x | – | x | – | x | – | x | – | x | – | x | – | x | – | x | – | x | – | x | – | x |

INVENTOR:
HUMPHREY F. PARKER
BY: Beau, Brooks, Buckley & Beau,
ATTORNEYS.

July 14, 1964    H. F. PARKER    3,140,669
CONVEYOR DISPATCH SYSTEM
Filed May 5, 1960    6 Sheets-Sheet 6
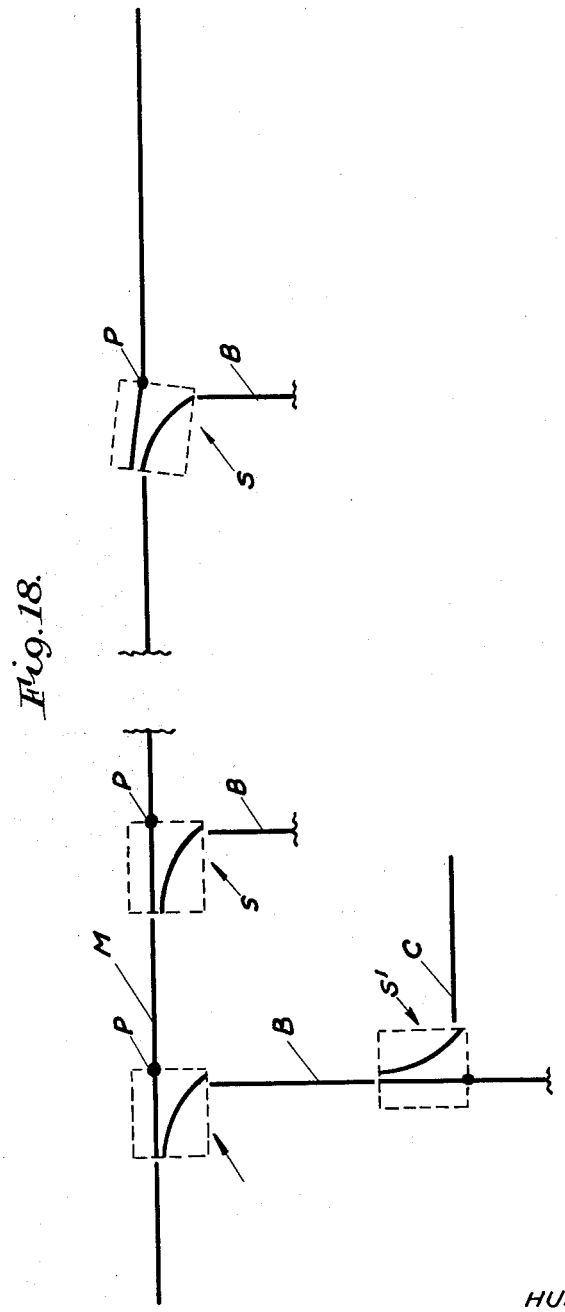
INVENTOR.
HUMPHREY F. PARKER
BY
Bean, Brooks, Buckley & Bean
ATTORNEYS

United States Patent Office 3,140,669
Patented July 14, 1964

3,140,669
CONVEYOR DISPATCH SYSTEM
Humphrey F. Parker, Buffalo, N.Y., assignor to
Columbus McKinnon Corporation
Filed May 5, 1960, Ser. No. 27,132
8 Claims. (Cl. 104—88)

This invention relates to a conveying system and pertains more particularly to improvements in such a system wherein each of a plurality of carriers or trolleys in the system may be dispatched from a loading point to reach, automatically, any one of a given number of storage stations in the system.

In transporting articles by means of a conveyor system, it is frequently desirable to permit the loader or operator to dispatch a plurality of conveyor means to a number of different stations within the system, and to do so by means of mechanism settable at the loading station or point of origin so that the subsequent diversion or routing of each individual conveyor means or carrier is achieved automatically. It is therefore an object of this invention to provide a system comprising a main line and a multiplicity of secondary or subsidiary lines and means for switching vehicles or carriers such as trolleys from the main line to a given subsidiary line or from a given subsidiary line to a further secondary line, each individual carrier or trolley being provided with encoding means, variable at the will of the operator prior to leaving the loading station, cooperable with readout mechanisms located adjacent the path of travel of the trolleys and immediately preceding the switching means in which the readout mechanism, in accordance with the encoded instruction received from the individual trolleys, actuates the adjacent switching means to effect the proper routing of the individual trolleys.

It is of primary concern in connection with the invention to provide certain improvements in conveyor systems wherein the number of selections for routing and storing of the individual trolleys is greatly increased as compared with conventional mechanisms, without necessitating serious complexity in the system.

A further object of this invention is to provide the greatest number of selections in a conveyor system with a small number of vertically spaced switch means by utilizing not only the switch means individually but also in combinations.

Another object of this invention resides in the use of two encoding means, one for the purpose of routing individual carriers or trolleys to particular subsidiary line and the other of which is used to select a particular unloading or storage station in the particular subsidiary line.

A further object of this invention is to provide an improved encoding mechanism for use in conveyor systems in which the encoding means includes a plurality of vertically spaced cam plates, each of a different profile and each aligned relative to the others so that there are presented a finite number of circumferentially equidistantly spaced camming stations, each presenting a different combination of camming possibilities equal in number to the total number of combinations possible with the particular number of cam plates used, in fashion similar to the encoding means disclosed in my copending application Serial No. 27,133, filed May 5, 1960.

FIG. 1 is an elevational view illustrating a portion of a conveyor system with one trolley thereof in the process of actuating one of the readout mechanisms;

FIG. 2 is a horizontal section taken generally along the plane of section line II—II in FIG. 1;

FIG. 3 is a vertical section taken on the plane of section line III—III in FIG. 1;

FIG. 4 is an enlarged transverse section taken along section line IV—IV in FIG. 2, and illustrating details of one of the encoding means;

FIG. 5 is a horizontal section taken through an encoder means as indicated by section line V—V in FIG. 4;

FIGS. 6, 7 and 8 indicate, in plan, the profiles of the cam mechanisms used in the encoder means;

FIG. 9 is a plan view of a modified form of encoder;

FIG. 10 is a vertical section taken along the plane of section line X—X in FIG. 9, illustrating details of the modified encoder;

FIG. 11 is a horizontal section taken along section line XI—XI in FIG. 10 showing further details of the modified encoder;

FIGS. 12, 13 and 14 show, in plan, certain of the cam profiles used in the encoder means of FIGS. 9–11;

FIG. 15 is a chart illustrating the coding arrangement of a three level system;

FIG. 16 is a chart similar to FIG. 15 but showing a quadruple level system;

FIG. 17 is a further chart showing the coding arrangement of a five level system; and FIG. 18 is a diagrammatic view illustrating a track system with which the present invention may be associated.

As shown in FIGS. 1–3, the conveyor system includes a trolley 10 having a plurality of wheels 11 supported on the lower track portions 12 and 13 of an overhead monorail indicated generally by reference numeral 14. The assembly 14 is provided with upper track portions 15 and 16 supporting the trucks 17 of the endless conveyor means operating in the monorail 14. The conveyor mechanism may be of any type, since the details thereof form no part of this invention. However, the system includes a main conveyor line from which are branched a series of subsidiary or secondary lines in turn having further secondary branches and so on, in accordance with the requirements of the system. Finally, there will be a number of storage lines within the ultimate subsidiary lines to ony one of which it may be decided to dispatch an individual trolley 10. A representative system is illustrated in FIG. 18. In this figure, the main line M is provided with a plurality of branch or secondary lines B and the main line may continue on after the last secondary line, as shown. At each branch of the system where a secondary line B originates, a switch mechanism S is located, each pivoted as at P so as to be movable to permit a trolley to either continue along the main line M or be diverted to a corresponding secondary line B. Each such switch may be of any conventional form and is actuated by the readout means of this invention which may be associated therewith. Branching from each secondary line may be a plurality of storage lines C, each having a switch or diverting mechanism S' associated therewith and, like the switches S, under the control of an associated readout means.

Each trolley is provided with encoding means such as the mechanisms 18 and 19 in FIG. 1. While in FIG. 1 two encoders have been shown, it will be understood that a single encoder may be used alone, or more than two may be used if desired.

The first of these encoding mechanisms 18, is operative to effect the routing of its associated trolley 10 to direct the same to the desired subsidiary line while the second encoding mechanism 19 is used to select the storage line to which it is desired to divert the trolley so that its load may be deposited at the proper point. For both routing and storing, the encoding mechanisms are cooperable with readout mechanisms such as those indicated by reference characters 20 and 21 located at the proper points.

In the preferred example a first encoder is used to direct a trolley to a subsidiary line and a second encoder to direct it to a storage line. In some situations a single encoder may be used to send a trolley direct to a storage line, and where a large number of storage lines are involved, two or more encoders may be used in combination. Thus with the system of FIG. 1, eight selections may be made by the use of a three level encoder. However, eight times seven or fifty-six selections may be made with a pair of three level encoders and appropriate circuitry in a pair of readout devices at each diverting switch. When encoders are used in combination they must be accurately spaced in relation to each other and provision must be made for accurate registration of the decoding switches at the readout stations. For the purpose of registration and to avoid duplicate selection, it is necessary to reserve one position on one of the encoder dials. Hence only seven of the eight available positions (or 15 out of 16) are available for use in combination selections.

With the encoder mechanism of FIG. 1, where encoder 18 is used for the selection of a subsidiary line and encoder 19 for the selection of a storage line, each of the first seven subsidiary lines is provided with a pair of readout stations. One of these, say 20, is provided with switches to cooperate with encoder 18. The other station 21 cooperates with encoder 19 by having switches at all three levels. Thus, any signal whatever on 19 will close one or more of the switches on 21, which are in parallel, and acting in series with the appropriate switches on 20 will divert a trolley onto a subsidiary line when called for by the coding. Trolleys coded 0 on encoder 18 will not be diverted to any of the first seven lines but will run on to an eighth or last line.

When a trolley has passed from the main line to a secondary line and approaches a storage line it enters a readout station of two units 20 and 21. In this case unit 21 performs selection by cooperating with encoder 19 and unit 20 performs registration by cooperating with whatever signal has diverted it onto the given subsidiary line. In the case of the eighth subsidiary line one readout station only, 21, is needed for cooperation with a signal on an encoder 19.

For example, in order to properly route the trolleys, a readout mechanism would be located adjacent each branch or subsidiary line effective to actuate switching mechanism to divert an individual trolley or to pass it, dependent upon the signal received from the individual encoding mechanism 18. Similarly, each storage point will be provided with a readout mechanism one of which the second encoding means will actuate to divert the trolley to that particular point.

The readout mechanisms may comprise a series of vertically spaced switches and the encoding means includes mechanisms for actuating any one or a combination of these switches. In this way, using switches at three levels, it is possible to effect eight combinations for routing or programming and seven combinations for storage. This is illustrated graphically in FIG. 15. In this figure, chart T indicates the coding of the mechanism 18 while chart U indicates the coding of mechanism 19. Letters A, B and C indicate the three levels of the switches of the readout mechanisms while the eight combinations are numbered 0 to 7. In these charts, a dash (–) mark indicates a non-actuated switch while an X mark indicates an actuated switch. In position 0, none of the switches is actuated whereas in position 7, all three switches are actuated.

FIGS. 4 and 5 illustrate one type of encoder mechanism which may be used. As shown, the mechanism includes a frame or housing having opposite side walls 30 and 31 provided with vertically spaced slots 32, 33 and 34, and 35, 36 and 37, respectively therein, these slots being at the levels of the switches in the readout mechanisms. The housing or frame further includes the top 38, bottom 39 and the end walls 40 and 41. They are mounted in any suitable fashion on the individual trolleys so as to properly position the side wall slots at the levels of the readout switches.

A vertical shaft 42 is journaled centrally within the housing and carries a series of spaced cam plates 43, 44 and 45. As specifically shown the shaft 42 is grooved circumferentially at its upper end to receive a circlip 46 to locate an upper spacer 47 which is journaled in upper bushing 48 in top 38; the shaft 42 also being provided with a longitudinal keyway 55 by means of which the several cam plates are made rotatable with the shaft. The uppermost cam plate 43 is sandwiched between this spacer 47 and an intermediate spacer 49 with cam plate 44 in turn sandwiched between spacer 49 and a further intermediate spacer 50. Last, the lowermost cam plate 45 is sandwiched between spacer 50 and a lower spacer 51, the latter of which is journaled in bushing 52 carried by bottom member 39. The indicating—operating dial 53 is fixed, by threaded member 54, to the lower end of shaft 42 and serves to locate spacer 51.

Shaft 42 is provided with a longitudinal keyway or groove 55 and the several cam plates and the dial 53 are provided with tongued apertures so as to be fixed in one position in the shaft (see particularly FIGS. 5–8).

As previously stated and as is shown in FIG. 15, there are eight combinations of switch actuation possible with three switch levels. For this purpose, the cam plates 43, 44 and 45 are movable simultaneously into any one of eight positions to achieve proper switch actuation. Since each switch at each level is actuated in four of the eight combinations, each cam plate is provided with four noses or projections to accomplish this. Therefor, cam plate 43 is provided with the four projections 60, 61, 62 and 63, cam plate 44 is provided with projections 64, 65, 66 and 67 and cam plate 45 is provided with projections 68, 69, 70 and 71.

These projections are aligned vertically so as to achieve the desired switch combinations. For example, projections 61, 64 and 68 on the respective cam plates 43, 44 and 45 are aligned, corresponding to position 7 (charts T and U of FIG. 15). Similarly, projections 62 and 70 of cam plates 43 and 45 are aligned, corresponding to position 5.

The upper cam plate 43 is provided with a series of circumferentially spaced apertures 72 cooperable with a locking pin 73 fixed to a flexible blade 74 secured at one end, as by fastener 75, to housing top 38, see FIG. 4. By lifting the blade 74 at its free end, pin 73 is withdrawn from the cam plate 43 and the cam assembly may then be rotated to a new position by turning dial 53. The particular cam plate projections which extend through side wall slots 32, 33 and 34 are effective to actuate the corresponding switches of the readout mechanisms.

As is shown in FIGS. 2 and 3, each readout mechanism may comprise a housing 80 within which are mounted three vertically stacked micro-switches 81, 82 and 83, each having an actuating button such as the button 84 on switch 83 (FIG. 2). Aligned with these buttons are apertures in housing 80 slidably receiving plungers 85, 86, 87 adapted to be moved by the noses 88 of cam followers 89 as such followers are rocked by engagement with the projections of cam plates 43, 44 and 45. Each cam follower is pivotally mounted upon the vertical pin 90 and normally projects laterally outwardly from housing 80 so as to be within the path of movement of the cam plate projections.

The above described mechanism is particularly well adapted for three-level readout switch operation. It will be understood that due to vertical space limitations, it is desirable to achieve as many combinations as is possible with the least number of levels. This is accomplished in the present instance by using combinations of the switches in the levels available and by using two encoding means, one for routing or programming and one for final storage positioning.

By utilizing four switch levels, sixteen combinations are available and with five levels, thirty-two combinations are available, and so on. However, with sixteen or more combinations, direct actuation of the readout switches may not be practical and for this reason, the indirect mechanism illustrated in FIGS. 9–13 may be used.

In this modified form of encoding means, four cam plates 100, 101, 102 and 103 are used, each of which has a multiplicity of projections, each operable to effect switch actuation in one or more positions. For each cam plate, there are eight positions in which a corresponding switch will be actuated, see FIG. 16. Cam plate 100 has three projections 105, 106 and 107. Projection 105 covers three positions, projection 106 covers only one position and projection 107 covers four positions. Cam plate 101 has four projections 108, 109, 110 and 111, covering two, two, one and three positions respectively. Cam plate 102 has six projections 112, 113, 114, 115, 116 and 117 covering one, one, one, one, two and two positions respectively, and cam plate 103 has five projections 118, 119, 120, 121, and 122 covering one, two, one, one, and three positions respectively. The projections on the several cam plates are so aligned as to achieve all of the combinations indicated in FIG. 16.

The cams are mounted in housing 125 similarly to the construction previously described except that the cams are disposed wholly in the housing regardless of their position. Mounted on the housing are a series of levers 126, one for each level of switches with each lever being pivotally mounted on a vertical pin 127. The housing is provided with slots 128 to permit the free ends 129 of the levers to project therefrom into engagement with corresponding cam followers 89. The levers are of such length, preferably, as to multiply the lift of cam plates 100–103, this being desirable since with sixteen or more positions of the cam plates, the angular rotation will be so small between cam positions that a great deal of cam lift is not practical. Each lever 126 is maintained against its cam plate by means of a tension spring 130 anchored at one end within the housing and at its other end to the free end 129 of the lever. As previously mentioned, it is possible to achieve sixteen combinations with the mechanism shown in FIGS. 9–14 and this indirect switch actuation is also effective to permit thirty-two combinations as by use of a five-level switch system, see FIG. 17.

I claim:

1. A conveyor system including a main line and a plurality of subsidiary lines interconnected therewith, there being certain of said subsidiary lines provided with a plurality of unloading stations, a plurality of trolleys movable from a common point on said main line for programming to any one of said subsidiary lines containing said unloading stations, first means carried by each of said trolleys for routing each trolley individually to its destined stated subsidiary line, and second means carried by each of said trolleys for routing each associated trolley to a predetermined one of said unloading stations, said first and second means comprising similar coding units, there being a plurality of readout mechanisms within said system for directing each trolley successively to its destined subsidiary line in response to actuation at said first coding unit, there being further readout mechanisms by each of said unloading stations responding to actuation by each of said second coding units.

2. A conveyor system comprising a main line and a plurality of subsidiary lines interconnected therewith with certain of said subsidiary lines being provided with predetermined unloading stations therealong, said main line having a common loading and dispatching point from which individual trolleys may be loaded and dispatched to any unloading station desired within the system, each trolley having a coding assembly fixed thereto including a plurality of vertically spaced coding members movable simultaneously into any one of a predetermined number of positions each position being different from any of the others with the total number of each position being equal to the total number of combinations available with the total number of coding members utilized, and means adjacent each line branch in said system for actuating switching means between one line and another, said means including a plurality of vertically spaced switches equal in number to the number of coding members and actuatable thereby to pass or divert a particular trolley in accordance with the coding presented by said members, a second coding assembly carried by each of said trolleys similar to the first mentioned coding assembly and being settable into a predetermined coding combination corresponding to one of said unloading stations, and means located at each unloading station for routing trolleys thereto, said last means being responsive to the second coding assembly of any trolley having its second coding assembly coded to correspond with such last means.

3. The assembly as defined in claim 1 wherein said first means comprising a housing having at least one side wall thereof provided with vertically spaced openings, a plurality of cam plates rotatably mounted for movement in unison to any one of a predetermined number of fixed positions relative to said housing, each cam plate being provided with a plurality of projections thereon whereby in certain of said fixed positions, one of said projections of individual cam plates will extend outwardly of the housing through said openings and in other positions no portion of individual cam plates will project from said housing, each cam plate being of a profile different from all the others with said cam plates having the projections thereon so aligned vertically as to successively present in said fixed positions all of the possible combinations obtainable with the total number of cam plates, and readout mechanisms comprising vertically stacked switch members actuatable by individual ones of said cam plates, said readout mechanisms being disposed adjacent line branches in said system and operable to actuate switching means associated with each of said branches to either pass or divert a trolley in accordance with the coding mechanism effective by said cam plates.

4. The assembly as defined in claim 1 wherein said first means comprises a coding assembly including a housing provided with a series of vertically spaced openings on one side wall thereof, a lever rotatably mounted at one end in said housing in association with each of said openings for movement therethrough between a retracted position and an extended position projected outwardly from the housing, and cam means rotatably mounted in said housing associated with each of said levers, said cam means being rotatable in unison to any one of a predetermined number of fixed positions relative to the housing, each of said cam means being a profile different from any of the others such that as the same are rotated sequentially through said fixed positions, said levers will be extended and retracted in all possible combinations in accordance with the number thereof, and vertically stacked switch means within said system adjacent each of the line branches therein for coded actuation by said levers to operate switch means in such branches to either pass or divert an individual trolley thereat.

5. The assembly as defined in claim 1 wherein said first means comprises a coding assembly including a housing provided with a series of vertically spaced openings on one side wall thereof, a lever rotatably mounted at one end in said housing in association with each of said openings for movement therethrough between a retracted position and an extended position projected outwardly from the housing, and cam means rotatably mounted in said housing associated with each of said levers, said cam means being rotatable in unison to any one of a predetermined number of fixed positions relative to the housing, each of said cam means being a profile different from any of the others such that as the same are rotated sequentially through said fixed positions, said levers will be extended and retracted in all possible combinations in accordance with the number thereof, and vertically stacked switch means within said system adjacent each of the line branches therein for coded actuation by said levers to operate switch means in such branches to either pass or divert an individual trolley thereat, said second means comprising a unit on each of said trolleys identical to said first means and being settable to a predetermined combination different from the setting of the first means, and there being additional groups of vertically stacked switch elements at each of said unloading stations for actuation only by said second means.

6. A conveyor system including a main line, a plurality of subsidiary lines extending from the main line and a plurality of storage lines extending from each subsidiary line,
- a trolley device for operation within the system,
- a pair of encoder means carried by said trolley device in given longitudinally spaced relation,
- each encoder means having a plurality of vertically spaced switch actuators, each selectively movable between actuating and inoperative positions,
- the total number of subsidiary lines not exceeding the number $2^N-1$ where N equals the number of switch actuators of one of said encoder means,
- the total number of storage lines not exceeding the number $2^n-1$ where $n$ equals the number of switch actuators of the other of said encoder means,
- switch means associated with each of said subsidiary lines and with each of said storage lines,
- a pair of readout members associated with each switch means, each such pair being disposed in said given spaced relation so that corresponding encoder means are simultaneously registrable therewith.

7. The system as defined in claim 6 wherein said main line is provided with a plurality of storage lines extending therefrom beyond the last subsidiary line,
- switch means associated with each of the last mentioned storage lines,
- and a readout member associated with each of the last mentioned switch means for actuation by one of said encoders.

8. The system as defined in claim 6 wherein N and $n$ are greater than 2.

References Cited in the file of this patent

UNITED STATES PATENTS

| | | |
|---|---|---|
| 1,130,452 | Vedder | Mar. 2, 1915 |
| 1,654,302 | Meyer | Dec. 27, 1927 |
| 1,783,763 | Abbe | Dec. 2, 1930 |
| 2,751,091 | Freeman | June 19, 1956 |
| 2,803,333 | Freeman | Aug. 20, 1957 |
| 2,877,718 | Mittag | Mar. 17, 1959 |
| 2,918,881 | Klamp | Dec. 29, 1959 |
| 2,989,928 | Fletcher | June 27, 1961 |